United States Patent [19]

Seymour

[11] Patent Number: 4,791,617

[45] Date of Patent: Dec. 13, 1988

[54] MOTION SENSING DEVICE

[75] Inventor: Robert H. Seymour, Grinstead, England

[73] Assignee: Geophysical Service Inc., Dallas, Tex.

[21] Appl. No.: 71,510

[22] Filed: Jul. 9, 1987

[51] Int. Cl.[4] .................. H04R 23/00; H04R 1/42; H01L 41/08

[52] U.S. Cl. .................. 367/171; 367/166; 367/178; 310/329

[58] Field of Search .......... 367/166, 171, 188, 178, 367/180, 164; 310/329, 331; 73/1 DV

[56] References Cited

U.S. PATENT DOCUMENTS

| | | | |
|---|---|---|---|
| 2,728,868 | 12/1955 | Peterson | 310/329 |
| 4,254,480 | 3/1981 | French | 367/22 |
| 4,300,220 | 11/1981 | Goff et al. | 367/188 |
| 4,334,296 | 6/1982 | Hall, Jr. | 367/180 |
| 4,505,014 | 3/1985 | McNeel et al. | 310/329 |
| 4,532,450 | 7/1985 | McNeel et al. | 310/329 |

Primary Examiner—Thomas H. Tarcza
Assistant Examiner—Ian J. Lobo
Attorney, Agent, or Firm—Joseph A. Walkowski; Gary C. Honeycutt

[57] ABSTRACT

An acceleration sensor uses a capsule of mercury filling a rigid enclosure with pressure sensors responsive to inertial forces exerted by the mercury on the walls of the enclosure when it is caused to accelerate. The enclosure may have a flexible lining on its walls or contain a flexible bag for holding the mercury. Means are provided for producing a bias pressure in the mercury. The enclosure may be cubic or tetrahedral, for example, and the outputs of the pressure sensors additively combined to produce outputs representing accelerations in required orthogonal directions when these differ from the directions to which the sensors are responsive. A rotational acceleration sensor is also described.

18 Claims, 2 Drawing Sheets

MOTION SENSING DEVICE

This invention relates to an acceleration sensing device, particularly for use in seismic reflection surveying.

The use of motion sensing devices is well known in the field of seismic reflection surveying, in which, vibrations, transmitted into the Earth from an explosion or other means and reflected towards the surface by the underlying rock strata, are subsequently sensed and recorded at various points distributed in a predetermined way relative to the source. The recordings of the reflected vibrations may then be analysed to yield information about the configuration of the strata.

The standard motion sensor for these applications is the geophone, in which a cylindrical mass with an attached electrical coil is suspended in a magnetic field which is rigidly coupled to the Earth. When the Earth's surface moves due to the reflected vibration the geophone produces a voltage proportional to the longitudinal velocity difference between the mass and the geophone casing.

This device is, however, limited in the following respects:

1. Its size and weight are relatively large. To make the geophone considerably smaller would increase the cost, as it is an electromechanical device with moving parts. It would also make it more difficult to achieve the required specification in parameters such as resonant frequency, sensitivity, dynamic range, and maximum amplitude, to provide the performance necessary.

2. It is normally an axial sensor only. Vertical component and horizontal component geophones require different suspensions and cases, with a risk of differing response characteristics, and a three component geophone is simply three normally-designed geophones packaged together and is of correspondingly larger size and weight.

3. The cost of the geophone itself is quite high and many of them are needed to be used in a survey. A heavy-effort seismic field crew may have some 30,000 geophones representing a large capital investment. A much less expensive sensor would enable more to be used, improving signal/noise ratios by improved array techniques, and/or routine recording of three components of motion rather than only one.

4. The response characteristics of a geophone suffer from significant (but known) phase and amplitude effects which are impressed upon the recorded signal and need to be compensated.

Another type of motion sensor used in seismic reflection surveying is the accelerometer. In this device, a pair of piezo-electric stress sensors are fixed between respective opposite faces of a metal mass and a frame rigidly attached to the Earth. Vibrations in the Earth are transmitted via the piezo-electric crystals to the metal mass, and the resulting inertial forces stress the crystals, thereby producing a voltage proportional to the acceleration of the mass. However, this device also is sensitive only to movement in one linear direction, and it cannot be made sensitive to acceleration in other directions because placing stress sensors on orthogonal faces of the mass would lead to frictional forces which would impede movement in directions parallel to the faces.

An object of this invention is therefore to provide an acceleration sensing device which can be of relatively small size, mass and cost, and which reduces, at least partially, the problems listed above. A further object of this invention is to provide a device, different examples of which would be capable of sensing acceleration or components of acceleration in one direction or two or three mutually perpendicular directions whilst having only one inertial mass.

According to the present invention there is provided an acceleration sensing device having a closed cell having effectively rigid walls containing a volume substantially filled with fluid with at least one pressure responsive means attached to a wall of the cell to respond to the pressure exerted by the fluid on the particular wall to which the pressure responsive means is attached, whereby signals are produced by the pressure responsive means representing an acceleration of the device with substantially no movement of the fluid relative to the cell.

The device may have two or more pressure responsive means located in different directions relative to one or more other pressure responsive means, the outputs of the pressure responsive means being combined differentially so as to respond to components of acceleration in those directions. Alternatively, the pressure responsive means may be located in different directions relative to a point of constant pressure of the fluid so that the outputs of those pressure responsive means respectively represent the components of acceleration in those directions.

The output signals of two or more pressure responsive means may be weighted and combined to produce a signal representing acceleration of the device in a direction defined by the relative positions of the pressure responsive means or their positions relative to the point of substantially constant pressure of the volume of fluid and the weightings applied to the output signals of those means. This may also be done with differentially connected pairs of pressure responsive means. Each pressure responsive means may be a piezo-electric crystal which may be connected to a buffer amplifier having a very high input impedance. Alternatively the output of the crystal may be used directly by connecting it through a capacitor to the virtual ground input of a charge amplifier having d.c. negative feedback.

In one example, the pressure responsive means are respectively responsive to components of acceleration in two or three mutually perpendicular directions. For example, the cell may be in the form of a cube, having pressure responsive means in the middle of each face of the cube, the pressure responsive means on opposite faces being connected together so that the difference between their outputs yields directly the components of acceleration along axes normal to the pairs of faces. Alternatively, the cell may be of tetrahedral form, having three orthogonal faces with pressure responsive means on each, and a fourth diagonally intersecting face completing the cell.

In another example, the outputs from the pressure responsive means may be combined in an electrical summing circuit to produce outputs respectively representing the components of acceleration in two or three orthogonal directions. In this case, the cell may have any polyhedral or curved shape, but it will preferably be shaped so as to permit the acceleration of the object being surveyed to be resolved in the desired directions by simple summation of the sensor outputs. For example, the cell may be a regular tetrahedron with pressure responsive means in the middle of each of the faces. A simple capacitor network connected to charge amplifiers would then be sufficient to resolve the outputs of the four pressure responsive means in three mutually perpendicular directions, although more elaborate summing means may be used. A resistor network could alternatively be used.

In another example, if it is desired to measure rotational acceleration, the cell may be provided with one or more pressure responsive means radially displaced from the axis of rotation for detecting the inertial forces acting on a fluid mass in a direction tangential to the axis of rotation. For example, the cell may be in the form of an arcuate tube with the pressure responsive means mounted on the end faces of the tube, perpendicular to the arcuate axis of the tube.

The fluid may be mercury or any other substance which is a liquid at the desired operating temperatures but which is preferably of high density and low viscosity.

The fluid may be sealed directly within the cell, or it may be contained within a flexible envelope matched to the shape of the cell. The envelope may be of a plastics material such as polyethylene or polypropylene.

The pressure responsive means may be mounted directly upon the cell walls, or in the case of a cell with an envelope, sandwiched between the envelope and the cell walls, the pressure responsive means being mounted on either of the surfaces. The pressure responsive means may alternatively be contained inside the envelope, or encapsulated within the walls thereof. The pressure responsive means may be piezoelectric crystal transducers, or any other suitable pressure sensitive devices. High input impedance buffer amplifiers may be provided to isolate piezo-electric transducers from the loading of a resistor summing network, for example.

The cell may be provided with means for applying a bias pressure to the fluid, which may be at the substantially constant pressure point. This bias pressure means may comprise a movable plug forming part of the walls of the closed cell, the movement of said plug affecting the enclosed volume of the cell, and thereby creating a bias pressure within the fluid. The position of the movable plug may be adjusted by means of a set screw provided on the exterior of the device, or alternatively by adjusting the tightness of fit of a cover plate and associated rubber gasket. The bias pressure should be sufficient to prevent cavitation of the fluid at the highest expected acceleration.

The device may be provided with means for rigidly coupling the device to the object whose acceleration is to be measured. This means may comprise a threaded stud or other fixing means provided on the outer casing of the device, to which a spike, clamp or other coupling device may be fixed.

An example of the invention will now be described with reference to the accompanying drawings in which.

Figures 1, 3:
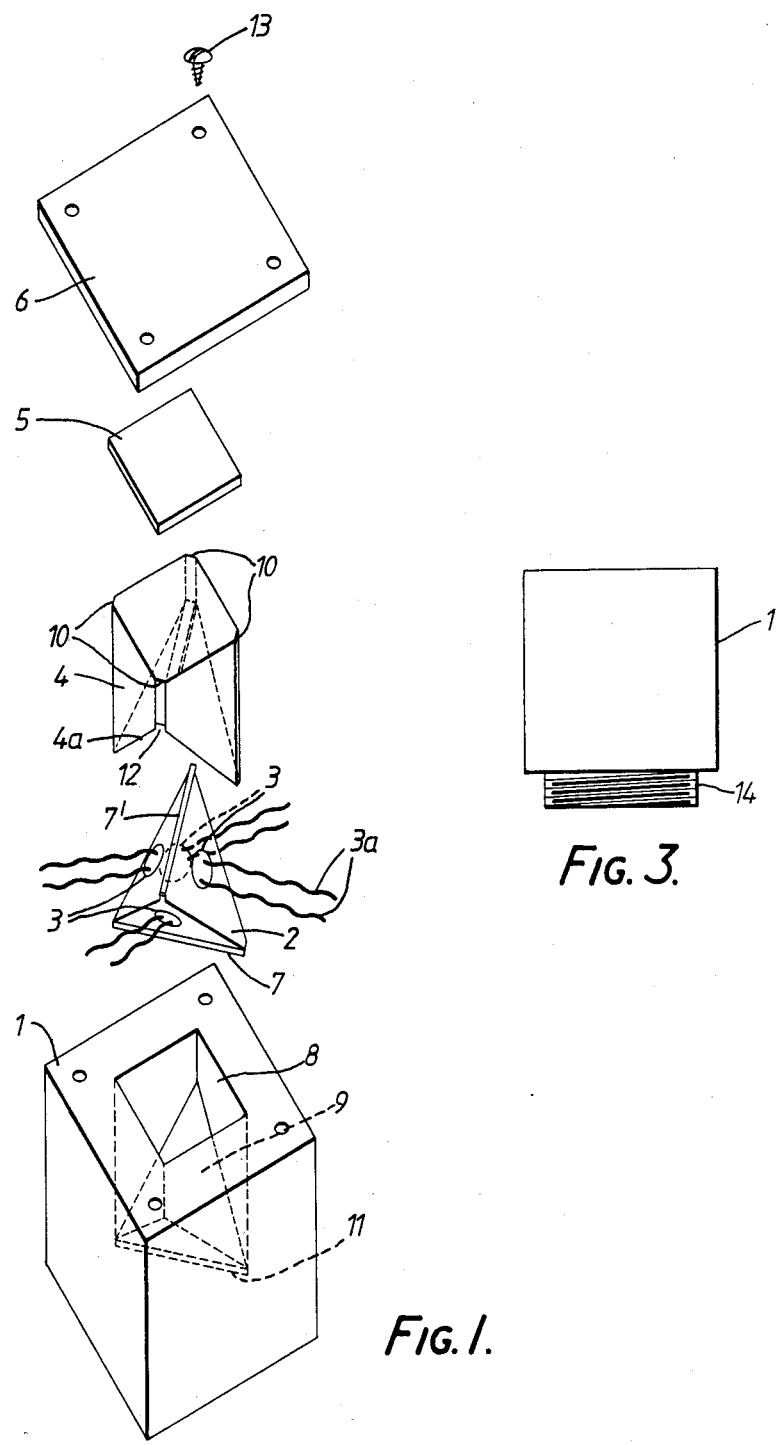
FIG. 1 shows a disassembled perspective view of the example of the invention, having a tetrahedran cell.
FIG. 3 shows the example of the invention with an attachment for a ground spike.

Referring to FIG. 1, a motion sensing device comprises an effectively rigid cubic case 1 made of steel, for example, having relatively thick walls, a flexible, fluid-containing envelope 2, piezo-electric crystal transducers 3, a plug 4, a gasket 5 and an end plate 6. The envelope 2 is filled with mercury and is formed into the shape of a regular tetrahedron by welding two crimps 7,7' along mutually perpendicular diameters of a flexible, mercury-filled, cylindrical tube, such that, after welding, the centre-points of the crimps are separated by a distance equal to $\pi r/\sqrt{2}$, where r is the radius of the tube. The tube may be of a plastics material such as polyethylene or polypropylene. Piezoelectric transducers on annular mounts 3 are attached to the centres of each of the four faces of the envelope.

The case 1 has, opening onto the upper face, a square cross-section cavity 8 of side $\pi r/\sqrt{2}$ the lower portion of which is adapted to the shape of the two lower faces of the tetrahedral envelope 2. The square plug 4, also of side $\pi r/\sqrt{2}$, is adapted for sliding fit within the cavity 8, and is shaped at its lower end 4a such that when placed within the cavity 8 a tetrahedral closed cell 9, matched to the size and shape of the envelope 2 is formed. The shaping of the lower portion of the cavity 8 may be achieved by fitting a second plug similar to the plug 4 into the lower end of a square hole almost or completely through the case 1, the second plug being orientated at right angles to.the plug 4. The corner edges 10 of the plug 4 are bevelled such that when the envelope 2 is placed within the cell 9, and the plug 4 is inserted in the cavity 8, the wires 3a of the transducers 3 may pass to the exterior of the case 1 along the triangular holes remaining at the corners. Both the cell 9 and the plug 4 are provided with grooves 11,12 to accommodate the end seams 7,7' of the envelope 2.

The transducers 3, envelope 2 and plug 4 are held in place in the cavity 8 by the square rubber gasket 5 and the cover plate 6. The cover plate is secured by four screws 13, which provide a bias pressure to the fluid in the envelope 2 by forcing the plug 4, via the rubber gasket 5, down upon the envelope 2. Alternatively, a set screw (not shown) may be provided screwed through the cover plate 6 to press on a plate outside the gaskets opposite the plug 4 and provide an adjustable bias pressure. The bias pressure should be sufficient to prevent cavitation of the fluid at the highest acceleration expected.

Instead of providing a separate envelope to contain the mercury the walls of the cell 9 may be coated with a flexible lining, e.g. a plastics material which is formed into an envelope either by being introduced into the cell in liquid form or by bonding together separately coated parts using heat or glue. The mercury could be introduced after the cell coating is completed through a suitable bore which is then plugged.

The case 1 may be made of a suitably rigid material which does not react with mercury in which case the plastics envelop or plastics coating may be omitted. Care should be taken to ensure that the outputs of the transducers 3 are not short-circuited by the mercury. The transducers 3 may be attached directly to the walls of the case 1 by an adhesive or by mechanical arrangements such as screws or clips so that they are squeezed by the pressure in the mercury at the locations of the transducers. As an acceleration of the mercury produces a uniform pressure gradient in it, it is the directions of the transducers relative to a point of constant pressure of the mercury which determine the components of the acceleration to which they respond. The location of such a point may be determined by the means for applying the bias pressure which will be sensibly constant. Alternatively, the transducers may be arranged in pairs responding in opposite senses to the same acceleration and connected differentially.

In one example the external faces of the case 1 form a cube of edge length 2 cm. and the cross-section of the cavity 8 in it is a square having sides of length 1 cm.

As shown in FIG. 3, the case 1 may also be provided with a threaded stud 14 for the attachment of a spike, or any other means for coupling the device to pick up vibrations from the Earth.

Figure 2:
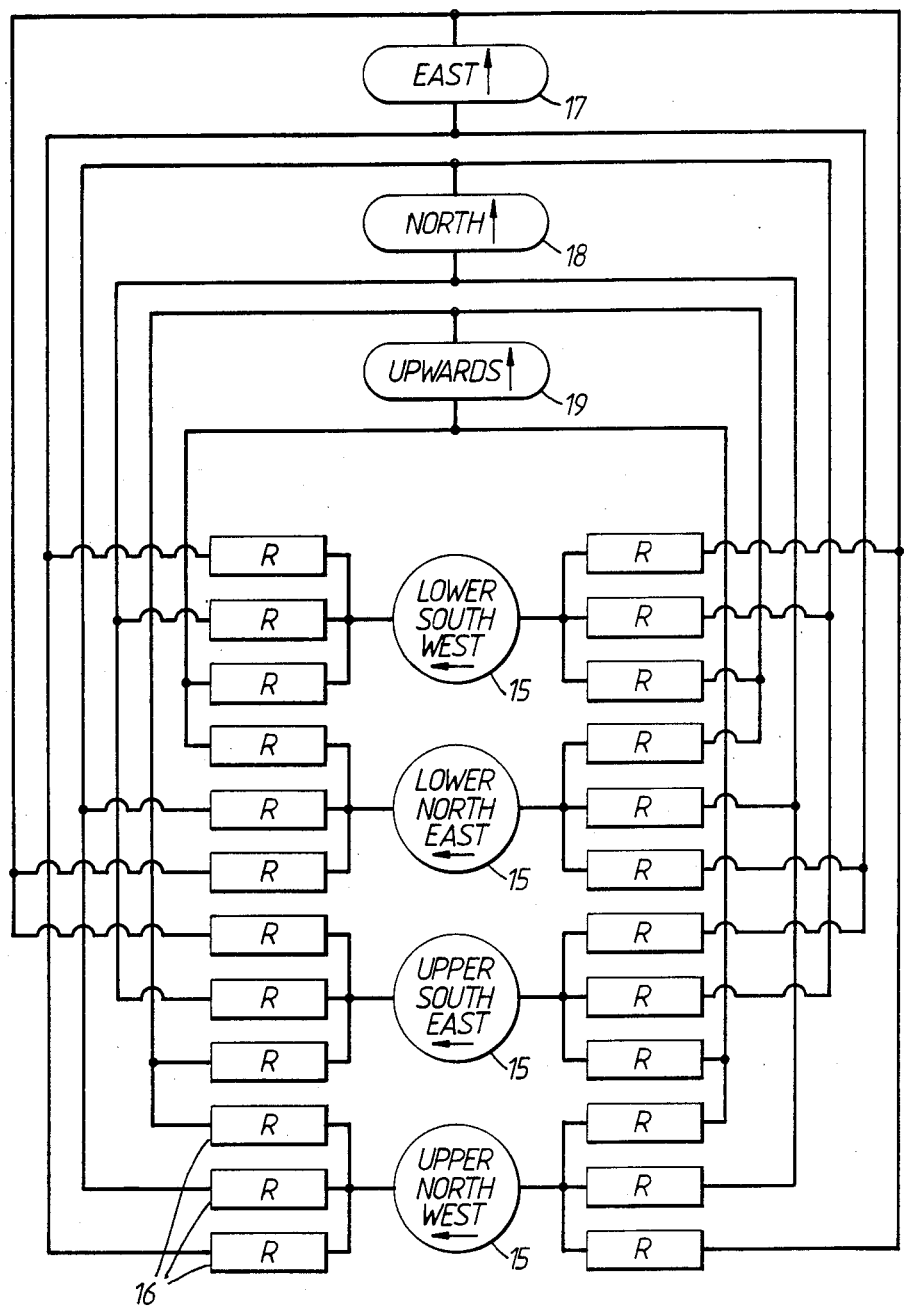
FIG. 2 shows an electrical network for use with the above embodiment of the invention.

The outputs from the crystal transducers 3 are fed by wires 3a to the inputs 15 of the resistor network shown in FIG. 2. This network resolves the acceleration of the fluid mass as measured by the transducers 3 into three orthogonal directions, as described below.

Assume that the three axes required are in the directions East, North, and Up, and that the device is placed plug upwards with the external faces facing the cardinal points, the output currents of the crystal transducers will be proportional to the pressure changes on the South-West Lower face, the North-East Lower face, the South-East Upper face, and the North-West Upper face of the envelope 2 respectively.

Each terminal of each crystal transducer is connected via three identical small value resistors 16 to the inputs of charge amplifiers 17, 18 and 19 for summing the East, North and Up components respectively. The charge amplifier input impedances are arranged to be very low compared to these resistors, and the impedances of the crystals to externally supplied current are very high, the current generated by each crystal is split almost equally between the three paths. Each charge amplifier receives one-third of the output of each crystal in parallel, in the appropriate sense (bearing in mind that pressure on one face implies acceleration away from that face) to yield the appropriate axial component.

That is: the East component is given by the sum of the Lower South-West and the Upper North-West less the Lower North-East and the Upper South-East contributions; the North component is given by the sum of the Lower South-West and the Upper South-East less the Lower North-East and the Upper North-West contributions; and the Upwards component is given by the sum of the Lower south-West and the Lower North-East less the Upper North-West and the Upper South-East contributions.

Preferably, the crystal transducers 3 are connected via respective buffer amplifiers (not shown in Figure) to the resistors of the network. The buffer amplifiers may have very high input impedances so as to draw only very small currents from the transducers. This would maintain the outputs from the transducers at low frequencies.

Alternatively, the outputs of the crystal transducers could be connected directly to a network of egual capacitors of the same configuration as the network of resistors. Each charge amplifier would be provided with d.c. negative feedback to produce a virtual ground at its input. This arrangement would have a lower cut-off frequency determined by the time constant of the feedback resistor and the capacitance at its input.

Other tetrahedral shapes may be used. For example, the tetrahedron may be defined by three orthogonal planes, normal to the axial directions with a fourth diagonal plane completing it. The constant pressure point should be located in the centre of the diagonal plane. Crystal transducers may be fitted to the three orthogonal faces of the tetrahedron, and since these can be located so as to yield the three axial components of acceleration directly.

In another embodiment of the invention, the device is provided with a cubical cavity and mercury envelope, and six crystals, one on each face of the cube, with those on opposite faces connected differentially. The crystals' outputs are connected through capacitors to the respective charge amplifiers for the three axes, in parallel with any other contributors with which they are to be combined or summed.

The axial components are given in the six crystal example by combining the outputs from pairs of opposite faces in opposing polarities. That is: the West face output less the East face output gives a signal proportional to the Easterly component; the South face output less the North face output gives a signal proportional to the Northerly component; and the Lower face output less the Upper face output gives a signal proportional to the Upwards component.

For the same external dimensions, the cubical example uses three times the quantity of fluid that the tetrahedral design requires, and avoids the need for a resistive network. Thus it is considerably more sensitive than the tetrahedral design.

Other shapes of cavity may be used. For example, if it is required to measure rotational accelerations a semi-cylindrical or semi-annular cavity could be used using differentially the outputs from two transducers on opposite sides of the axis on the diametal face or faces. Other sector shapes could also be used although compensation would be required for the effects of non-rotational accelerations.

In all of these embodiments of the device, mercury is used to form an inertial mass filling a rigidly defined volume. It is contained in a closed cell with stress sensors lining or partly-lining the walls of the cell, mounted so as to react to changes of pressure in the mercury due to acceleration of the mercury as a result of acceleration of the cell. There is no relative movement within the mercury itself.

In the absence of rotational effects, the acceleration of the mercury in any direction produces a uniform pressure gradient within the mercury in that direction of a magnitude proportional to the acceleration, and the position of a transducer relative to the constant pressure point of the mercury determines the resolved part of the pressure gradient to which it responds.

The use of a fluid for the mass, because it attenuates shear forces strongly, permits transducers to be used in more than one orientation on the mass simultaneously. If stress sensors were placed on a solid mass, for example on three orthogonal faces of a cube, then motion along one of the axes would be impeded by friction against the sensors for the other two. In many cases these other two sensors would also produce unwanted readings as a result of the frictional transmission of shear forces.

The cell and the sensors are shaped in a manner such as to permit the integration to be performed relative to the desired axes by simple weighted summation of the sensor outputs, being in these embodiments cubical with faces perpendicular to the axes, or regular tetrahedral with edges perpendicular to the axes.

The whole device is rigidly coupled to the Earth's surface or other object whose motion is to be measured. The axial force measurement from the device, less the gravitational weight of the fluid mass, divided by the value of the mass, gives the acceleration measurement along each axis. In the case of crystals being used as stress sensors, the weight correction disappears, as the crystal output is proportional to the derivative of stress, and integration gives a force measurement without bias.

I claim:

1. An acceleration sensing device, comprising:
   a housing containing a cavity therein defined by substantially rigid walls and having an opening to the exterior of said housing;
   a flexible envelope of substantially the same shape as said cavity disposed in said cavity and completely filled with a volume of fluid;
   plug means adapted to close said cavity opening immediately proximate said flexible envelope, the inner extent of said plug means matching the configuration of said envelope at said opening and in intimate contact therewith; and
   pressure responsive means disposed between at least one of said rigid walls and said envelope and adapted to produce a signal responsive to fluid pressure resulting from acceleration of said fluid within said device.

2. The device of claim 1, wherein said envelope and said cavity when closed by said plug means are in the shape of a tetrahedron, and said pressure responsive means comprises a pressure transducer secured to at least three of said tetrahedron-shaped envelope's four walls.

3. The device of claim 1, further comprising biasing means adapted to cause said plug means to exert a bias pressure on said envelope when said plug is inserted in said cavity opening.

4. The device of claim 2, wherein said tetrahedron is a regular tetrahedron, and a said pressure transducer is secured to each of said envelope's four walls.

5. The device of claim 4 wherein said envelope is formed into said regular tetrahedron shape by forming two crimps along mutually perpendicular diameters of a flexible fluid filled cylindrical tube, said crimps having center-points separated by a distance equal to $\pi r \sqrt{2}$, where r=the radius of the tube.

6. The device of claim 5 wherein said cavity opening is square, and the inner extent of said plug means substantially defines two walls of said regular tetrahedron-shaped cavity.

7. A device according to claim 1, having two or more pressure responsive means located in different directions relative to a point of substantially constant pressure of the volume of fluid for detecting components of acceleration in those directions.

8. A device according to claim 1 having at least one pair of pressure responsive means located at opposite positions relative to the volume of fluid with the signals from the pair of pressure responsive means combined differentially to produce an output representing the component of acceleration along the line from one pressure responsive means to the other.

9. A device according to claim 8 having several pairs of pressure responsive means wherein the line from one pressure responsive means to the other of each pair lies in a different direction.

10. A device according to claim 1 having two groups of pressure responsive means, each group having at least two pressure responsive means, wherein the signals from the pressure responsive means of the groups are additively combined in the same way for both groups to produce respective output signals from the groups, and the output signal of one group is differentially combined with the output signal from the other group to produce a total output representing the component of acceleration in a direction from a point defined by the additive combination of the other group.

11. A device according to claim 5 wherein the same plurality of pressure responsive means is divided into pairs of groups and their outputs combined in two or more different ways to produce different outputs representing components of acceleration in different directions.

12. A device according to claim 9 in which the pressure responsive means are respectively represent components of acceleration in two or three mutually perpendicular directions.

13. A device according to claim 9 having an electrical circuit for the weighted summation of the outputs from the pressure responsive means to produce a signal representing a component of acceleration in another direction.

14. A device according to claim 1 in which the walls of said cavity are coated with a flexible lining to form said envelope.

15. A device according to claim 1 in which the pressure responsive means are piezo-electric crystal transducers.

16. A device according to claim 15 wherein each piezoelectric crystal transducer is connected through a capacitor to the virtual ground input of a charge amplifier from which the output signal from the transducer is obtained.

17. A device according to claim 1 wherein the fluid is mercury.

18. A device according to claim 1 particularly adapted for use as a seismic surveying instrument.

* * * * *